INVENTOR,
MARK S. ZIMMERMAN
BY Harry M. Saragovitz, Edward J. Kelly, Herbert Berl & Julian C. Keppler
ATTORNEYS

PILOT PROCESSING FOR PHASE SHIFT KEYED RECEIVER

Filed Oct. 14, 1965 Sheet 2 of 2

INVENTOR,
MARK S. ZIMMERMAN
BY Harry M. Saragovitz, Edward J. Kelly, Herbert Berl & Julian C. Keppler ATTORNEYS 3,428,752

PILOT PROCESSING FOR PHASE SHIFT KEYED RECEIVER

Mark S. Zimmerman, Bala-Cynwyd, Pa., assignor, by mesne assignments, to the United States of America as represented by the Secretary of the Army

Filed Oct. 14, 1965, Ser. No. 496,200
U.S. Cl. 179—15 3 Claims
Int. Cl. H04j *1/04*

ABSTRACT OF THE DISCLOSURE

A high frequency phase shift keyed receiver is shown in which frequency multiplexed signals are received. Each channel comprises a pilot of reference phase and an information component of variable phase. The received signals are converted to time multiplexed format and then the pilot component is separated from the information component by integration. In order to improve the quality of the pilot reference, the pilot signals from a given channel plus the channels on either side thereof are summed to provide a composite reference pilot of greater accuracy.

The present invention relates to a high frequency radio receiver and more particularly ot an improved receiver for use in the Army's KATHRYN System (AN/GSC-10) coherent phase shift keyed (PSK) high frequency radio teletype and digital data system. In this system a plurality of frequency multiplexed subcarriers are transmitted with a spacing of 100 cycles between adjacent subcarriers. Each transmitted subcarrier comprises an information (I) component and a pilot (P) component in phase quadrature. The transmitted pilot signals on each baud or bit are of the same phase but the phase of the information component of different bauds relative to the pilot varies with the binary information being transmitted. At the receiver the frequency multiplexed subcarriers are converted to time division multiplexed form by means of a Fourier transformer. The complex-valued samples or bauds representing the various subcarriers then occur sequentially at a common frequency. An integration or correlation process is then used to extract the pilot or reference phase for each time multiplexed channel. The extracted pilot is used as a reference against which the phase of the information component is measured. The correlation process is accomplished by multiplying the received Fourier transformed signal by a local pilot reference and integrating the complex-valued signals of each channel independently for as long a time as is allowed by the ionospheric stability time. Fluctuations of the ionosphere cause the pilot component of the same channel to fluctuate in phase from baud to baud and thus destroy its usefulness as a reference of fixed phase. However, in order to effectively separate the pilot component from the information component which is varying in phase from baud to baud, it is necessary to maximize the integration time. The improved receiver which is the subject of the present invention makes use of the fact that a large degree of correlation or phase coherence exists between the pilot signals received on adjacent frequency subcarriers. Because of this correlation the reference for a particular channel can be derived by summing the pilots from the particular channel and the two channels on either side thereof to provide three times the original number of reference pilot samples in the integration process.

It is therefore an object of this invention to provide an improved receiver for high frequency multiplexed phase shift keyed radio signals.

Another object of the invention is to provide a more accurate phase reference for use in demodulating phase shift keyed signals which have been reflected by the ionosphere.

A further object of the invention is to provide an improved phase shift keyed multiplex receiver which will operate with a reduced error rate in the presence of severe ionospheric fluctuations.

These and other objects and advantages of the invention will become apparent from the following detailed description and drawings, in which.

Figure 1:
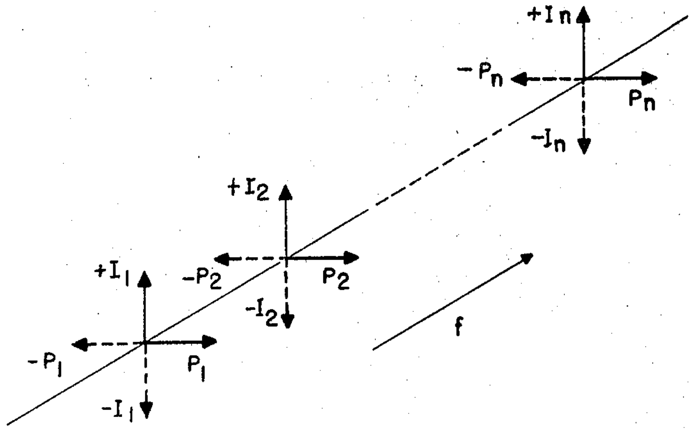
FIG. 1 shows vector diagrams of the transmitted signals of a PSK multiplex system of the KATHRYN type.

Referring to FIG. 1, there are shown therein three sample signals comprising three different channels of a single frame. Each channel comprises an information or I component and a pilot or P component, adjacent channels being spaced 100 cycles apart along the isometric frequency axis. The reference phase for all of the pilot signals is 0°, as shown by the direction of the $P_1$, $P_2$ and $P_n$ vectors. The phase of the information components will vary between +90° and −90° (or +I and −I) depending on the binary phase information impressed thereon by the transmitter. In addition to the binary information to be transmitted, both the information and pilot components are phase modulated by pseudo-random waveforms for secrecy and antijamming purposes. At the receiver the pseudo-random modulation is removed before the binary information is recovered. The vector $-P_1$, $-P_2$ and $-P_n$ of FIG. 1 show the alternate position of the pilot vector caused by the pseudo-random modulation.

Figure 2:
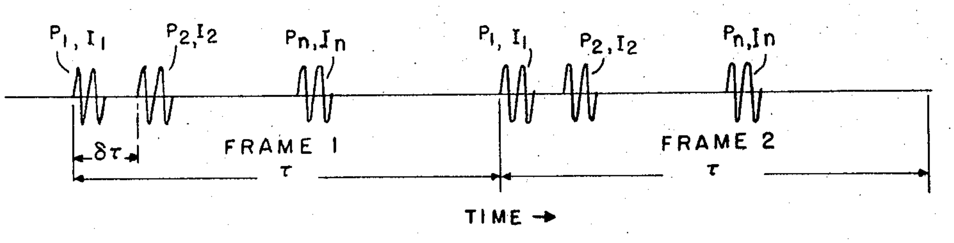
FIG. 2 shows the same signals after conversion to time multiplex in the receiver.

FIG. 2 shows two frames of the time multiplexed signal after it passes through the Fourier transformer of the receiver. The adjacent channels ($P_1$, $I_1$), ($P_2I_2$), etc. are separated by a time $\delta\tau$, the entire frame length being $\tau$. The channels are all on a common frequency. This greatly simplifies the receiver circuitry since only a single time-shared signal path is required for a large number of channels. The signal ($P_1$, $I_1$) of frame 1 represents the first baud or bit of channel 1 and the signal ($P_1$, $I_1$) of frame 2 the second baud of channel 1, etc.

Figure 3:
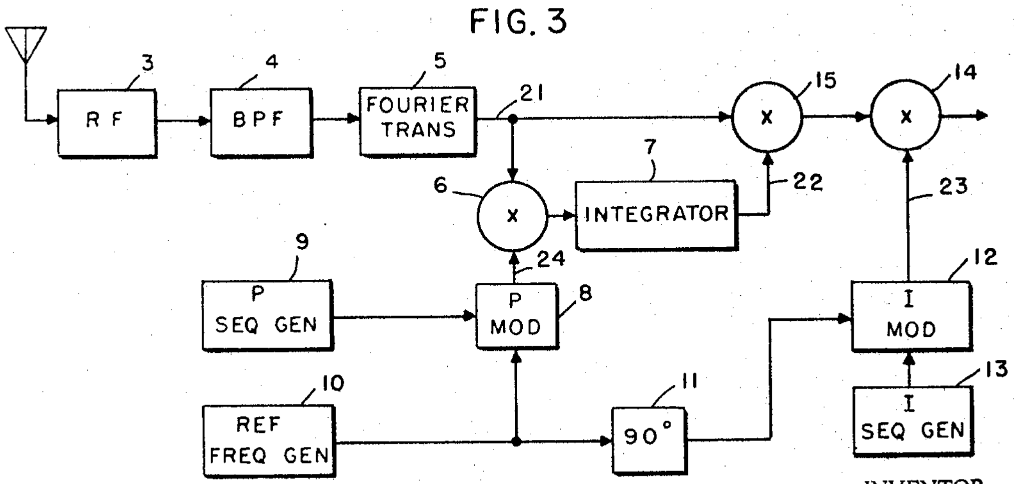
FIG. 3 shows a conventional KATHRYN receiver.

The conventional receiver for these signals includes, in FIG. 3, radio frequency amplifier 3, bandpass filter 4 and Fourier transformer 5, all connected in cascade as shown. The time multiplexed output of Fourier transformer 5 at lead 21 is applied to multiplier 6 and multiplier 15, the latter functioning as a coherent detector. Reference frequency generator 10 has its output directly applied to P modulator 8 and to I modulator 12 via 90° phase shifter 11. The second input of P modulator 8 is P sequence generator 9. The output of P modulator 8 forms the second input of multiplier 6. The output of multiplier 6 forms the input of integrator 7, the output of which forms the reference input of coherent detector 15 at lead 22. The I sequence generator 13 forms the second input of the I modulator 12, the output of which is fed to multiplier 14. The other input of mutliplier 14 is the output of coherent detector 15.

The received signals are amplified in radio frequency amplifier 3, filtered in bandpass filter 4 and converted to the time division multiplex format of FIG. 2 in Fourier transformer 5. The reference frequency generator 10 operates at the same frequency as the output of the Fourier transformer. The P modulator 8 modulates the output of 10 with a pseudo-random signal from P sequence generator 9 which is the same as the random modulation impressed on the P component at the transmitter. The multiplication of the output of the Fourier transformer and the output of the P modulator in multiplier 6 cancels the pseudo-random modulation of the P component. The multiplier 6 may take the form of a balanced modulator. The output of the P modulator at lead 24 constitutes the local pilot reference referred to earlier.

After removal of the pseudo-random modulation from the P component, each channel will, in the absence of ionospheric fluctuations, comprise a pilot of fixed phase and an information component which alternates between +90° and −90° relative to the pilot due both to the intelligence and the superimposed pseudo-random modulation. This signal is applied to integrator 7. In simplified form the integrator comprises a delay line with a delay equal to the frame length $\tau$. Thus any given baud or complex-valued signal (P, I) will emerge from the delay line just as the next baud of the same channel enters. The output of the delay line is recirculated by adding the line output to the input. Since, in the absence of ionospheric fluctuations, the pilot phases of the same channel will be coherent or the same, the recirculation tends to enhance the pilot portion of the complex signal and also tends to wash out the information component because the latter is randomly modulated and successive bauds thereof will not correlate. This process is similar to the pre-detection integration used in radar receivers in which a periodic signal is extracted from noise by correlation methods. The extracted reference pilot signal at lead 22 at the output of the integrator is applied to multiplier 15 which functions as a coherent or synchronous detector for the output of the Fourier transformer. Thus the output of multiplier 15 contains the I component intelligence as well as the I component pseudo-random modulation and the latter is removed by the multiplier 14, which operates in similar fashion to multiplier 6. The I component pseudo-random sequence is impressed on the phase shifted output of the reference frequency generator 10 in the I modulator 12, the output of which is applied to multiplier 14 via lead 23. The output of multiplier 14 therefore contains the demodulated intelligence signal which is applied to decision circuitry, not shown.

The time constant of the integrator 7 refers to the number of times the signal is recirculated therein. In order to obtain an accurate or clean reference pilot signal at the output of the integrator, the time constant should be long. However, ionospheric fluctuations will cause phase shifts between successive pilot components of the same channel and hence will render the previously integrated pilot signal thereof obsolute. Therefore, if the system is to produce an accurate reference pilot under conditions of a rapidly fluctuating ionosphere, the time constant of the integrator should be short. A comprise between these two requirements will necessarily result in an increased error rate.

Figure 4:
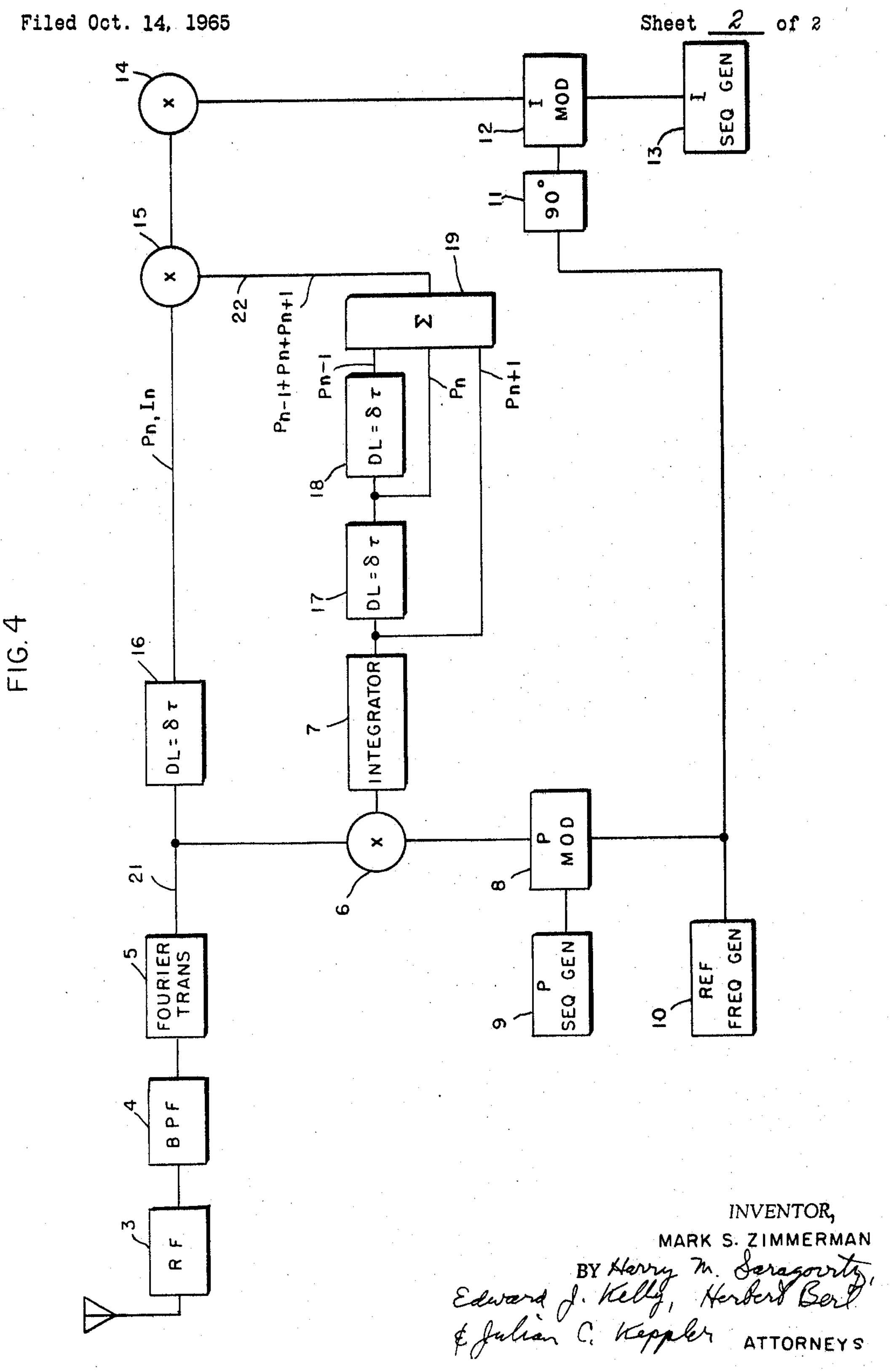
FIG. 4 shows an improved receiver embodying the principles of the present invention.

The improved receiver of FIG. 4 includes an improved pilot reference derivation system which takes advantage of the fact that a large degree of phase correlation exists between signals received on adjacent subcarriers. This correlation has been found to exist in spite of the dispersive nature of ionospheric transmission and is probably mainly due to the close frequency spacing of the subcarriers. In the receiver of FIG. 4 the pilot reference for a particular channel is derived by coherently adding the integrated references of a particular channel and those on either side thereof to provide three times the number of original pilot reference samples in the integration process. This means that a composite pilot reference sample of approximately the same accuracy can be obtained with an integration time constant of ⅓ that of the conventional receiver of FIG. 3. In FIG. 4, the circuit elements corresponding to those of FIG. 3 bear the same reference numerals and perform the same function. The additional circuitry of FIG. 4 comprises the delay line 16 between the output of the Fourier transformer 5 and the input of coherent detector 15; two delay lines 17 and 18 in cascade at the output of integrator 7; and adder 19. Adder 19 has one input connected directly to the output of integrator 7, a second input connected to the output of delay line 17 and a third input connected to the output of delay line 18. The composite pilot reference signal appears at the output of adder 19 and is applied to coherent detector 15 via lead 22. The delay line 16 in the main signal path as well as delay lines 17 and 18 all provide delays of $\delta\tau$, equal to the adjacent channel spacing. Therefore, it can be seen that when a particular baud ($P_n$, $I_n$) appears at the output of delay line 16, the output of integrator 7 will comprise the integrated reference pilot $P_{n+1}$ of the next succeeding channel; the output of delay line 17 will comprise the integrated reference pilot $P_n$ of the same channel and the output of delay line 18 will comprise the integrated reference pilot $P_{n-1}$ of the next preceding channel. These three pilot signals are summed in adder 19 the output of which is used to coherently detect the *n*th channel. Thus three adjacent pilot signals from the output of the integrator are combined to provide a composite reference pilot for demodulating the median of the three adjacent channels. This technique may be extended to the coherent combination of other than three pilot signals where the coherent bandwidth of the ionospheric medium is sufficiently wide.

It should be noted that the circuit diagrams of FIGS. 3 and 4 are simplified in that certain synchronizing and frequency conversion circuitry have been omitted therefrom, however the circuitry shown clearly illustrates the mode of operation of the KATHRYN PSK system and the improvement therein which constitutes the present invention.

While the invention has been described in connection with an illustrative embodiment, the inventive concepts disclosed herein are of general application and hence the invention should be limited only by the scope of the appended claims.

What is claimed is:

1. In a phase shift keyed high frequency radio-telegraph system in which a plurality of channels are transmitted in frequency multiplexed form and in which each channel comprises a complex-valued signal comprising a pilot signal of reference phase and an information signal which varies in phase with respect to said pilot signal and in which the received signals are converted to time multiplex form and in which the pilot signal for each of said time multiplexed channels is extracted from each of said complex-valued signals and in which said extracted pilot signal is used as a phase reference for demodulating said information signal; the improvement comprising, means comprising a plurality of delay lines to derive said phase reference signal for a particular channel by summing the pilot signals of said particular channel and the two channels on either side thereof.

2. Circuitry for processing time multiplexed phase shift keyed signals each comprising a reference pilot signal and an information signal in phase quadrature, comprising, a source of said time multiplexed signals, integration means and a first delay line connected to said source, second and third delay lines connected in cascade to the output of said integration means; a three input adder, one input of said adder being the output of said integration means, another input thereof being the output of said second delay line, and the third input thereof being the output of said third delay line; a coherent detector, the reference input thereof being the output of said adder and the signial input thereof being the output of said first delay line, the time delay of all of said delay lines being equal to the time spacing of said time multiplexed signals.

3. Circuitry for processing time multiplexed phase shift keyed signals which comprise a pilot component of reference phase and an information component of variable phase; said circuitry comprising, means to sequentially integrate said time multiplexed signals to extract a sequence of pilot signals of reference phase, and means to combine the pilot signals from three adjacent channels to provide a composite reference pilot for demodulating the median of said three channels, said last-named means comprising a plurality of delay lines and an adder.

References Cited

UNITED STATES PATENTS

| | | | |
|---|---|---|---|
| 2,379,744 | 7/1945 | Pfleger | 178—44 |
| 3,028,487 | 5/1958 | Losee | 250—8 |
| 3,149,308 | 11/1959 | Lehan et al. | 340—147 |
| 3,168,699 | 2/1965 | Sunstein et al. | 325—472 |
| 3,317,838 | 5/1967 | Ham | 325—31 |
| 3,337,850 | 8/1967 | Loumeau | 340—172.5 |

ROBERT L. GRIFFIN, *Primary Examiner.*

C. R. VON HELLENS, *Assistant Examiner.*

U.S. Cl. X.R.

325—65, 476